United States Patent [19]

Sato

[11] Patent Number: 4,777,010
[45] Date of Patent: Oct. 11, 1988

[54] ROD DRIVE CONTROL SYSTEM FOR NUCLEAR REACTORS

[75] Inventor: Takao Sato, Ibaraki, Japan

[73] Assignee: Hitachi, Ltd., Tokyo, Japan

[21] Appl. No.: 312,896

[22] Filed: Oct. 19, 1981

Related U.S. Application Data

[63] Continuation of Ser. No. 018,333, Mar. 7, 1979, abandoned.

[30] Foreign Application Priority Data

Mar. 10, 1978 [JP] Japan .................................. 53-26546
Mar. 10, 1978 [JP] Japan .................................. 53-26547

[51] Int. Cl.$^4$ ............................................. G21C 7/06
[52] U.S. Cl. ..................................... 376/215; 376/216;
376/219; 376/228; 376/236; 376/240
[58] Field of Search ............... 376/215, 216, 219, 228,
376/236, 240

[56] References Cited

U.S. PATENT DOCUMENTS

| | | | |
|---|---|---|---|
| 3,899,727 | 8/1975 | Thayer | 376/228 |
| 4,066,497 | 1/1978 | Sato | 376/216 |
| 4,125,432 | 11/1978 | Brooks | 376/228 |

Primary Examiner—Donald P. Walsh
Attorney, Agent, or Firm—Antonelli, Terry & Wands

[57] ABSTRACT

A rod drive control system for nuclear such as boiling water reactors is comprised of a plurality of stepping motors for inserting and withdrawing control rods disposed within the nuclear reactor, which the stepping motors are each provided for each control rod, terminal units which are each provided for each stepping motor and are each provided with a motor controller to drive the related stepping motor and to check the operation of the motor, a central processing unit for transferring an operation signal to the motor control unit and for detecting faults in the terminal units, and transmission lines between the terminal units and the central processing unit.

11 Claims, 11 Drawing Sheets

ROD DRIVE CONTROL SYSTEM FOR NUCLEAR REACTORS

This is a continuation of application Ser. No. 018,333, filed Mar. 7, 1979, now abandoned.

BACKGROUND OF THE INVENTION

The invention relates to a rod drive control system for power nuclear reactors and, more particularly, to the rod drive control system with stepping motors.

The reactor power and power distribution of nuclear power reactors are controlled or adjusted by means of driving control rods of approximately 200, which are provided within the nuclear reactor, to and from the nuclear reactor core. By convention, the positioning of the control rod is carried out by using a magnetic jack or a hydraulic drive mechanism. In a high-power run of the reactor, it is desirable that the unitary stepwise motion of the control rod for its positioning purpose is as small as possible. Conversion of a rotary motion of a drive motor into a rectilinear motion by means of a screw mechanism has been used for this fine positioning of the control rod. This fine positioning method has been employed particularly in the numerical control machine tool. The positioning control of the control rod is very important, from a safety point of view. The following cases, for example, should be avoided for ensuring the safety of the nuclear power plant. The first case is that, even when no operation signal is applied to a control rod, the control rod automatically moves. The second is that the control rod moves in the opposite direction to that directed by a command signal.

Such cases arise from faults of components, introduction of external noise into the control unit, or the like. The conventional numerical control system is compelled to take a compromise countermeasure for the problem of minimizing fault occurence and system cost rise. The compromise countermeasure taken hinders a satisfactory solution of the problem.

SUMMARY OF THE INVENTION

Accordingly, the primary object of the invention is to provide a rod drive control system using stepping motors or other motors of this type.

Another object of the invention is to provide a rod drive control system which can detect faults of stepping motors or stepping motor control units before a control rod is driven.

An additional object of the invention s to provide a rod drive control system with a simple construction and a high reliability.

A rod drive control system according to the invention for achieving these and other objects is comprised of: a plurality of stepping motors for inserting and withdrawing control rods disposed within the reactor, which are each provided for each control rod, terminal units which are each provided for each stepping motor and are each provided with a stepping motor controller which, in response to a drive signal in a command signal, produces a stepping motor drive signal and, in response to a test signal, checks the operation of a stepping motor and sends back an acknowledge signal representing the state of the operating motor; a central processing unit including first means for alternately transmitting a command signal and a test signal to the step motor controllers, second means which compares the test signal applied to the terminal unit with the acknowledge signal returning from the terminal unit for detecting a fault of the terminal unit, third means for superposing the drive signal of the step motor on the command signal at given time intervals, and fourth means for changing the given interval of the third means in accordance with an operation mode of a control rod; and transmission lines provided between the central processing unit and the terminal units.

DESCRIPTION OF THE PREFERRED EMBODIMENT

Before entering the explanation of a rod drive control system according to the invention, a major characteristic of a stepping motor will briefly be described.

As well known, the stepping motor is a kind of a synchronous motor in which a rotor rotates in synchronism with the current switching in a stator winding and produces a torque only at the synchronous speed. Since the rotor is loaded with inertia, its starting speed is limited to the maximum allowable starting speed determined by the magnitude of the inertia and the output torque. In accelerating the motor to a certain speed, the motor steps out unless the acceleration is set up at a value less than a predetermined one. This state of the stepping motor is illustrated in FIG. 1.

Figure 1:
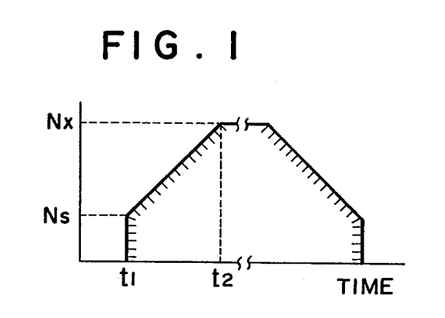
FIG. 1 shows a running characteristic of a stepping motor.

In FIG. 1, reference character Ns denotes the maximum allowable starting speed, Nx a maximum running speed and $(Nx-Ns)/(t2-t1)$ an allowable acceleration. The step motor must be operated within the confines of the slanted scope in the figure. In a system with such a stepping motor, the motor speed and the rotational direction must accordingly be controlled properly within such confines.

Figure 2:
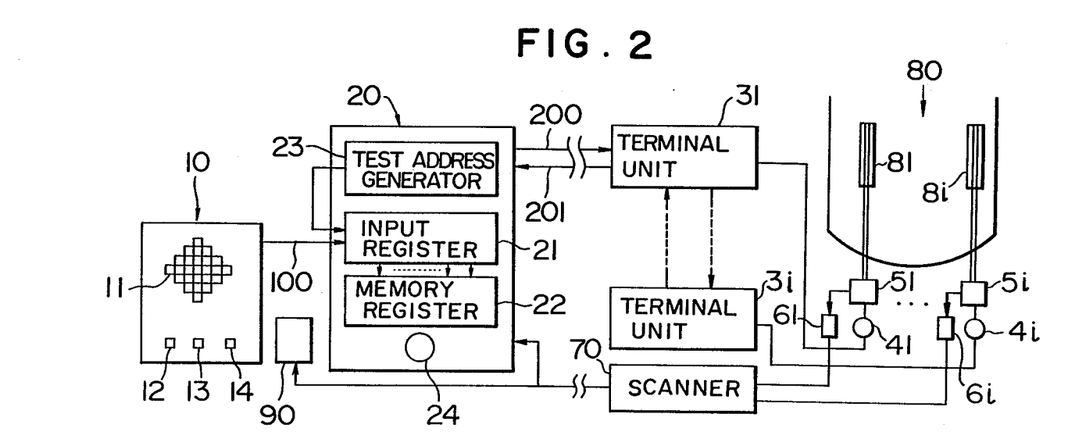
FIG. 2 illustrates, by way of a block diagram, an overall of a rod drive control system which is an embodiment according to the invention.

An embodiment of the rod drive control system according to the invention will be described in detail with reference to the accompanying drawings. Referring to FIG. 2, there is shown an overall construction of the rod drive control system for a nuclear reactor 80 such as a boiling water reactor.

Figure 3A:
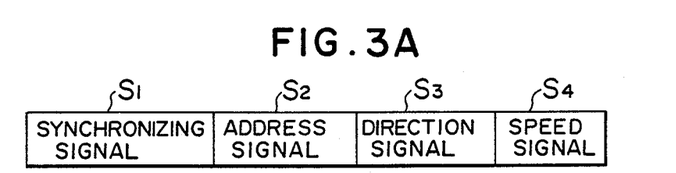
FIGS. 3A and 3B show formats of operation signals.

An operation board 10, which is partially and simply illustrated, is generally installed in a central control room and is provided with three switches 12 to 14 and an array 11 of control rod selection switches. The switch array 11 is used to select a control rod to be controlled. The switch 12 enters a command to inset a control rod into a reactor core. The switch 13 enters a command to pull it out of the reactor core. The switch 14 is operated simultaneously with the switch 12 or 13, in a sequential operation. An operation signal as shown in FIG. 3A is formed through the operation of this switch 14. As shown, the operation signal includes a synchronizing signal S1, an address signal S2 (determined by a selection switch), a direction signal S3 (determined by the insertion switch 12 or the withdrawal switch 13), and a speed signal S4 (determined by the switches 12, 13 and 14). Such an operation signal may be formed by using a conventional technique so that the explanation of the formation technique will be omitted here.

Figure 3B:
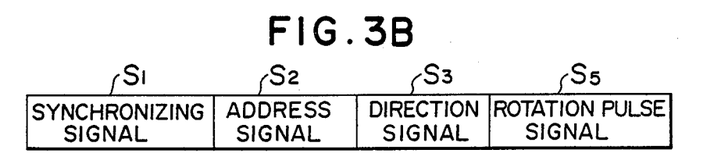

In FIG. 2, the operation signal is applied through a line 100 to the central processing unit 20 which is comprised of an input register 21, a memory register 22, a test address generator, and an error indicator 24. The operation signal 100 and a test command (the output signal of the test address generator 23) are alternately loaded into the input register 21. The test command means a signal to test if the exciting condition of the motor is normal or not. The contents of the input register 21 is then transferred to the memory register 22 (at this time the contents of the input register is not erased), and, in the next cycle, it is transmitted as a command signal to the terminal units 31 to 3i by way of the line 200. The command signal, which is as shown in FIG. 3B, includes a synchronizing signal S1, an address signal S2, a direction signal S3 and a rotation pulse signal S5. In case that the contents of the command signal indicates a test signal, only the address signal S2 is designated and the signals S3 and S4 are all "0" or "1".

Figure 4:
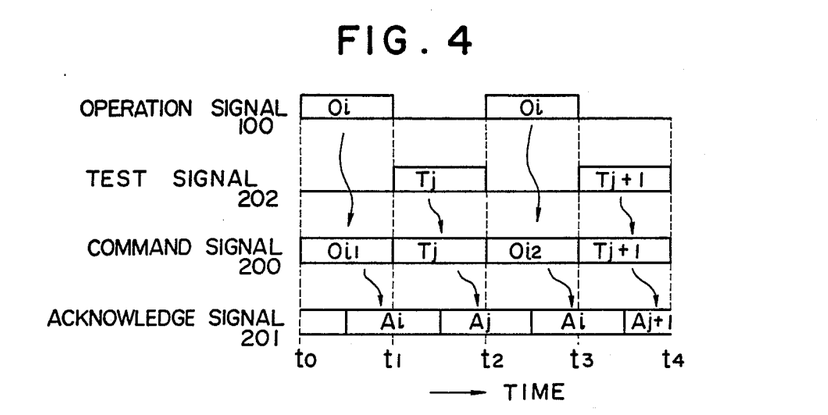
FIG. 4 illustrates how a command signal is formed.

As described above, the command signal is comprised of the operation signal and the test signal and is shown in FIG. 4. In the figure, the operation signal 100 designates the address of the ith control rod (assume that the numbers assigned to the control rods are treated as the addresses of them), and a test signal 202 designates the jth control rod address during a time period t1 to t2 and the j+1th control address during the succeeding time period t2 to t3. Those are alternately outputted as a command signal. In the sequential operation, the rotation pulse signal S5 of the operation signal Oi in the command signal 200 going out of the central processing unit 20 changes with time. This state will be described with reference to FIG. 5.

Figure 5:
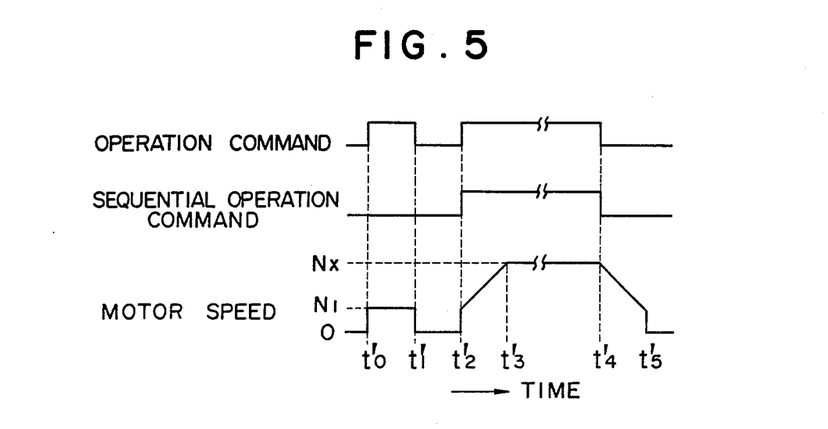
FIG. 5 diagramatically illustrates how to control a speed of a stepping motor.

In FIG. 5, during the time period t'0 to t'1, a control rod is operated for a unitary distance and the motor runs at a constant speed N1 which is slightly slower the maximum allowable starting speed denoted by Ns in FIG. 1. During a time period t'2 to t'4, a sequential operation command is continuously produced. During a time period t'2 to t'3, the motor is accelerated at an acceleration smaller than an allowable one and is rotated at the maximum speed Nx for a given time. Then, it is decelerated from time point t'4 and then stops at time point t'5.

Each terminal unit 31 to 3i receives the signal thus constructed and judges if the address in the command signal received corresponds to the address of the terminal unit per se. If so, the terminal unit drives its associated stepping motor at a specified speed. Further, an operation or test command signal is applied to the terminal unit, it detects a magnetic exciting state of the motor or the like and sends it as an acknowledge signal back to the central processing unit 20. This state is shown in FIG. 4 and, as seen from the figure, an acknowledge signal having the contents corresponding to the command signal, is sent back to the central processing unit 20, with some delay behind the command signals.

The central processing unit 20 compares the contents of the memory register 22 with the acknowledge signal corresponding to it and, if the acknowledge signal is improper in comparison with the contents of the command signal, its erronous state is indicated by the error indicator 24. The position of the control rod 31 to 3i driven by its associated stepping motor 41 to 4i is detected by a position detector, for example, a shaft-encoder, coupling with the corresponding transmission mechanism 51 to 5i. The position detector produces an output signal for transmission to the corresponding multiplexer 61 to 6i. In the multiplexer 61 to 6i, the address of the control rod and the control rod position data are arranged into a data word with a fixed length (for example, 32 bits), which in turn is transferred in time division fashion by a scanner 70 to a display unit 90 and the central processing unit 20. The display unit 90 digitally displays the position of the control rod.

The respective sections of the rod drive control system described above referring to FIG. 2 will be described in detail with the related drawings.

Figure 6:
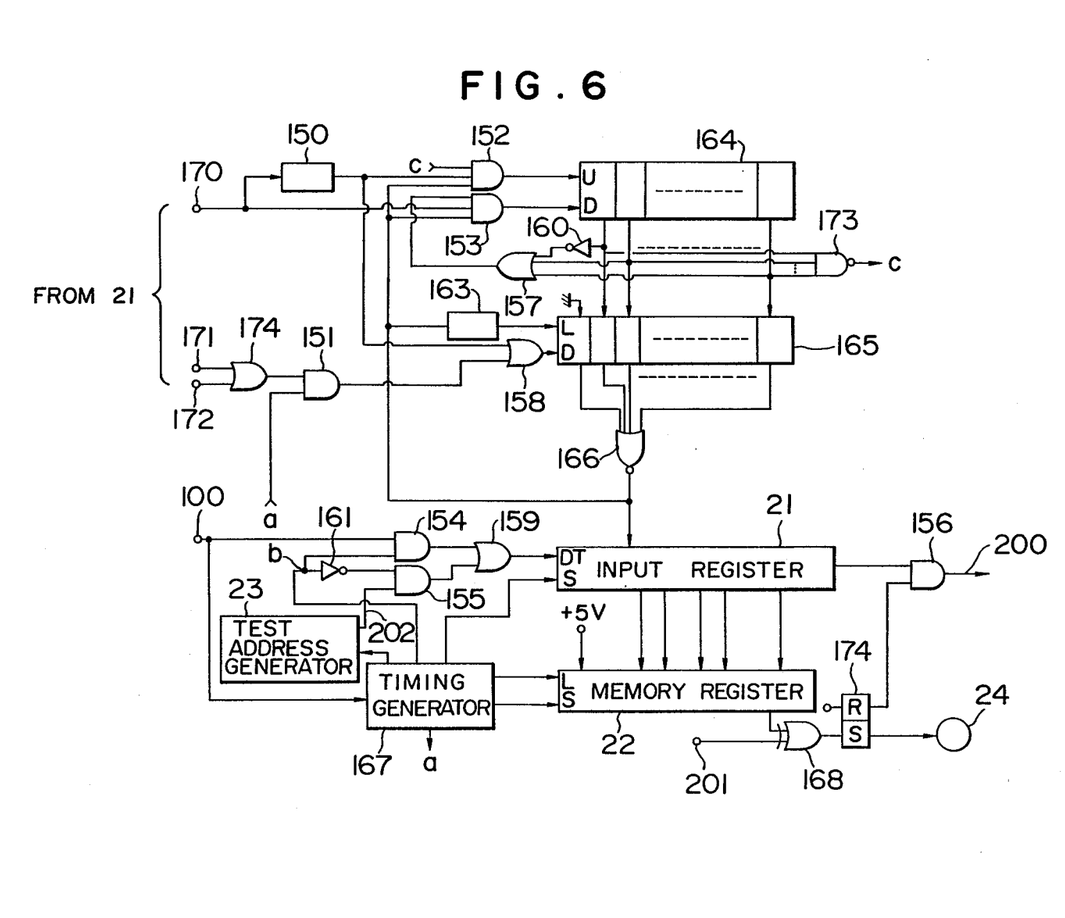
FIG. 6 shows a circuit diagram of a central processing unit which is used in the rod drive control system according to the invention.

A circuit diagram shown in FIG. 6 shows the details of the central processing unit 20 (FIG. 2) of the rod drive control system. In operation, an operation signal entered from the operation board 10 shown in FIG. 2 is applied to a terminal 100 in FIG. 6. The test address generator 23 delivers a test signal with the address of a control rod to be tested to the input register 21. More specifically, the operation signal is applied to one input terminal of an AND gate 154 and the test signal is applied to one input terminal of an AND gate 155. An output signal b generated by the timing generator 167 is directly applied to the other input terminal of the AND gate 154 and is applied through an inverter 161 to the other input terminal of the AND gate 155. With such a connection, the operation signal 100 and the test signal 202 are alternately applied through an OR gate 159 to the input register 21 for each machine cycle.

Figure 7:
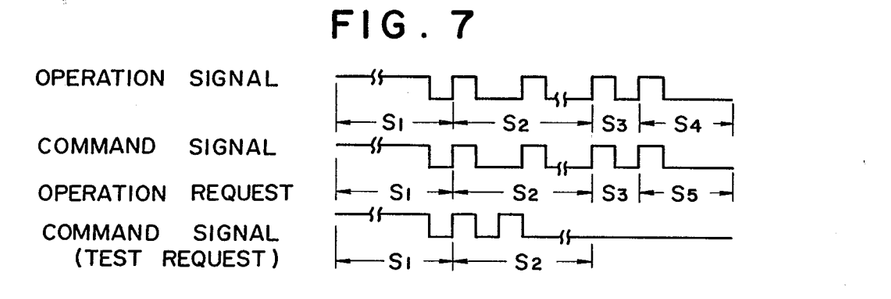
FIG. 7 shows waveforms of signals used in the central processing unit shown in FIG. 6.

When the switch 12 or 13 in FIG. 2 is turned on, the speed signal bit in the operation signal loaded in the input register 21 becomes "1" which in turn is inputted from the input register 21 to both input terminals 171 and 172 of an OR gate 174, via a latch (not shown). Similarly, when a sequential operation switch 14 shown in FIG. 2 is turned on, logical "1" appears at a terminal 170. An example of such an operation signal is illustrated in FIG. 7.

The explanation to follow is the case (the control during the period t'0 to t'1 in FIG. 5) where the control rod is moved at a constant slow speed. This operation s not the sequential operation and thus the terminal 170 is "0" so that the output signal of an up/down counter 164 is constant. At this time, the signal at the terminal 171 or 172 is logical "1". Accordingly, when the output pulse a from the timing generator 167 is applied to the AND gate 151, a speed program counter 165 reduces its count value by one. A binary signal corresponding to 100, for example, of decimal number has been set in the counter 165.

When logical "1" presents at the terminal 171 or 172, a timing pulse a with a given period (100 μs, for example) is applied to the terminal D of the counter 165. Accordingly, after 100 μs×100, the binary output signals of the counter 165 are all "0". At this time, the output signal of the NOR gate 166 becomes "1". The output signal of the NOR gate 166 inverts the bit of the rotation pulse signal S5 in the input register 21 into "1". Simultaneously, the pulse passed through a delay circuit 163 permits the output signal (the binary signal corresponding to decimal 100) to be loaded into the counter 165. At this time, one of the input terminals of each AND gate 152 and 153 has logical "0" so that the output signal of the counter 164 does not change.

Figure 8:
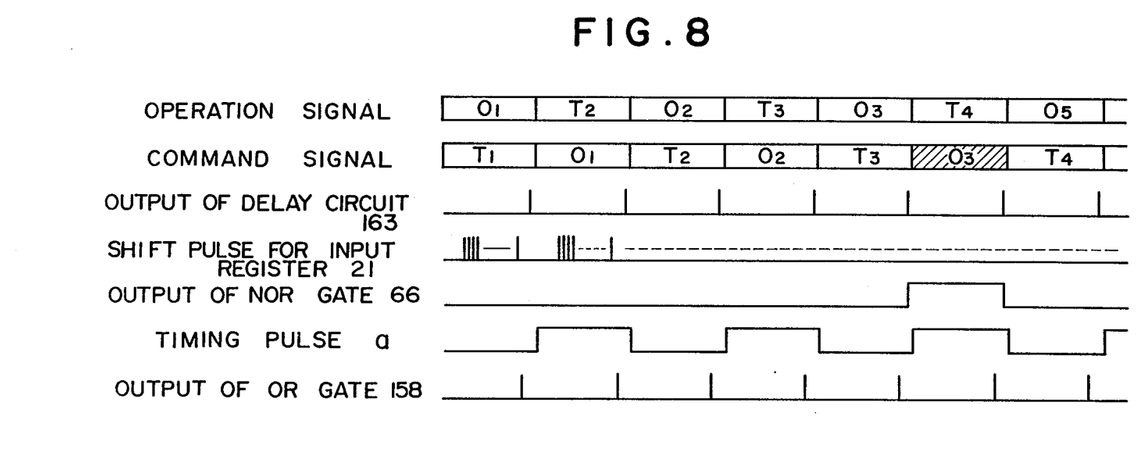
FIG. 8 shows a set of waveforms useful in explaining the operation of the central processing unit shown in FIG. 6.

A command signal with the rotation pulse bit S5 of "1" is outputted every time a numeral (e.g. 100) loaded into the counter 165 becomes zero, as indicated by $O_3$ in FIG. 8. Therefore, if the time length (machine cycle) of one command word is 100 μs, pulses for rotating the stepping motor are repeated at the period of 100×100 μs=10 ms.

The command mentioned above is used when the step motor rotates at a low speed. The control rod operation for a unit distance is carried out in this manner.

Explanation will be made of a case that a step motor is driven at a variable speed for effecting a sequential operation. Only difference of this case from the former case is logical "1" appears at the terminal 170. At the instant that the contents of the counter 165 becomes zero and the output signal of the NOR gate 166 becomes "1", the output signal of the AND gate 153 becomes "1" which in turn is applied to the down terminal D of the counter 164. As a result, the contents of the counter 164 is reduced by one.

After this, the output signal of the delay circuit 163 becomes "1" which is in turn applied to the terminal 1 of the counter 165 so that a numeral, which is less by one than the former case, is loaded into the counter 165. Similarly, the output of the counter 164 decreases one by one every time the output of the NOR gate 166 becomes "1" and the output of the counter 164 is loaded into the counter 165.

As described above, the contents of the program counter 165 is successively decreased every time the output signal of the NOR gate 166 is outputted. Accordingly, the time period between adjacent two rotation pulse bits is successively shortened, as shown in FIG. 9 and the stepping motor is gradually accelerated on the basis of the time period shortened.

Figure 9:
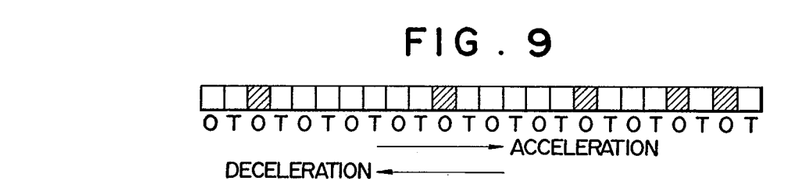
FIG. 9 diagramatically illustrates a speed setting of a stepping motor.

As shown in FIG. 8 or 9, the operation command applied to the terminal 100 and the test command applied onto the line 202 are alternately applied to the input register 21 through the OR gate 159, at the period of the timing signal a. For this reason, the motor drive signal "1" which is the output signal from the NOR circuit 166 should not have the same timing as that at which the test command is produced. Therefore, the least significant bit input of the counter 165 is earthed so as to be always zero, with the result that the rotation pulse bit becomes "1" only when the contents of the counter is an even number and therefore only the operation command is active.

As seen from the above description, the bit number of the speed program counter 165 or the up/down counter 164 and the connection of both the counters, determines an acceleration of the motor. Accordingly, the motor acceleration may be set within an allowable value of the motor.

In the example of FIG. 6, the least significant output of the up/down counter 164 is coupled with the second bit input of the program counter 165. When the output bits except the least significant bit are all zero, the output of the OR gate 157 becomes "0" so that the AND gate 153 blocks the inputting of the counting pulse to the counter 164.

Under this condition, a numeral loaded into the counter 165 is always 2 and the bit of the rotation pulse becomes "1" every time the operation signal is outputted. This is a state of the motor when it rotates at the maximum speed. This states continues until the sequential operation signal disappears. Since the maximum speed of the motor is determined by a numeral loaded in the speed program counter, the motor speed may properly be set by changing the loaded numeral.

The process of a motor deceleration will be given.

When the sequential operation switch 14 is turned off, the signal at the terminal 170 becomes logical "0" and timer 150 is triggered to have "1" at the output. The "1" output signal enables the AND gate 152 so that the counter 164 is counted up every time the output signal of the NR gate 166 becomes logical "1". In other words, the time period between adjacent two bits of rotation pulse increases with time, unlike the acceleration mode of the motor. In this manner, the motor decelerates. When all the bits of the counter 164 become "1" (the minimum speed), the output signal of the NAND gate 173 becomes "0" thereby to block further counting and the motor is settled down at a constant speed. At this time, if the operation signal at the input terminal 171 or 172 of the OR gate 174 is "1", the motor continues its rotation. When it is "0", the motor continues its rotation until the output of the timer 150 becomes "0", and then stops its rotation. The motor speed is controlled as described above in the rod drive control system according to the invention.

The comparing operation of the central processing unit 20 will be described. A command signal once stored in the input register 21 is partly loaded into the memory register 22 via the decoder 169 in response to a signal generated from the timing pulse generating circuit 167. That is to say, the same contents as a predetermined acknowledge signal is stored in the register 22. The contents of the register 22 and an acknowledge signal transferred from a terminal unit are compared bit by bit by an exclusive OR (EOR) gate 168, with respect to the addresses and the contents of the operation. When both signals are not coincident, the flip-flop 174 is set to block further outputting of the command from the AND gate 156 and to drive the error indicator 24 for indicating the erroneous state. Such a comparing operation by the central processing unit has been known as a return comparing method.

In connection with the motor drive, a 3- or 4-phase motor employs 1-2 phases magnetic exciting system and a 5-phase motor employs a 2-3 phases magnetic exciting system. In those system, exciting phase winding number changes every pulse. Namely, for example, in a 3- or 4-phase motor, one phase is excited in response to the first input pulse and other two phases are excited in response to the second input pulse.

When the exciting phase winding number is detected in order to check if a stepping motor operates in a normal condition or not by using the return comparing method, it is necessary to know the exciting phase numbers before and after the rotation pulse is applied. There has been no stepping motor positioning apparatus with such a function until now.

The comparing or verifying method employed in the rod drive control system according to the invention judges the motor magnetic excitation to be normal when 1 or 2 out of 5 phases is excited in the case of a 3-phase motor, 1 or 2 out of 4 phases is excited in the case of a 4-phase motor, and 2 or 3 out of 5 phases are excited in the case of a 5-phase motor.

For this, the address signal and the rotation direction signal are directly loaded into the memory register 22. For the purpose of the exciting phase detection, those are loaded with the bits being always "1" and, in the terminal unit, the corresponding bits are set to "1" when the exciting condition is satisfied. The terminal unit will be described in detail later.

Such a scheme can check to see if the address of the terminal unit having received an operation command, the operation direction and the exciting phase number of the stepping motor respectively are correct or not.

Explanation will be given of a terminal unit which receives an operation command or a test command as shown in FIG. 7 and drives a step motor on the basis of the command. The terminal unit is provided for one control rod and therefore the number of terminal units are the same as the control rods.

Figure 10:
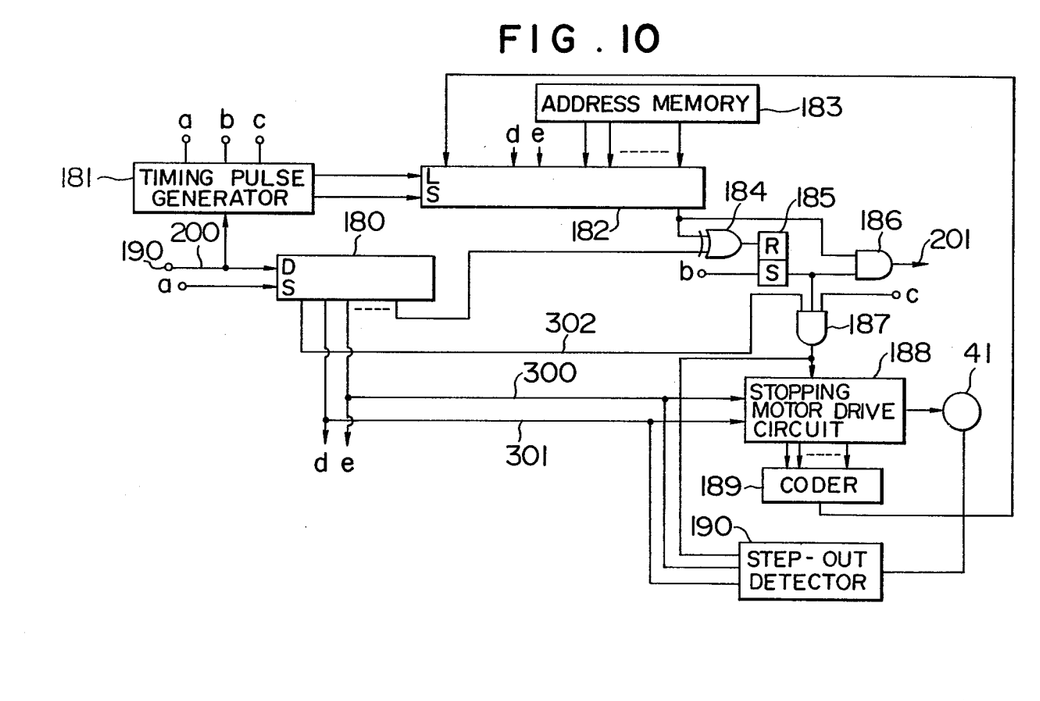
FIG. 10 shows a circuit diagram of one of the terminal units shown in FIG. 2.

An example of the terminal unit is illustrated in FIG. 10. When the operation command is applied to a terminal 190, the terminal unit checks if the address in the operation command is coincident with the address of the terminal unit per se or not, in the following manner. A signal from the timing pulse generator 181 first causes an address memory 183 to transfer the address of the terminal unit to a return register 182. The terminal unit address shifted out of the register 182 and the address in the command outputted from a control register 180 are compared by an EOR gate 184. If a not-coincident bit pair is found between both the addresses, the flip-flop 185 is reset. If the corresponding bits between them are perfectly coincident, the output signal of the flip-flop 185 remains "1" state. Accordingly, rotation direction signal (lines 300 and 301) loaded into the control register 180 is applied to a stepping motor drive circuit 188 a rotation pulse bit (line 302) is applied to an AND gate 187.

At a proper time the timing pulse generator 181 produces a pulse to the terminal C and if the rotation pulse bit is "1", the stepping motor drive circuit 188 rotates the motor 41 by one step. Conversely, if it is "0", the motor does not rotate.

Simultaneously, data in the return register 182 is transferred through an AND gate 186 to a terminal 201. The data is transferred as an acknowledge signal to the comparing circuit, through the terminal 201. Accordingly, the data of the acknowledge signal detects the same address as that of the command signal, the rotation direction (terminals d and e) and the exciting phase winding number of the stepping motor and is sent out through a coder 189. As described above, the terminal unit has the functions of address comparison, acknowledge signal formation and motor drive. Further, its circuit construction is simple since it has not a speed control circuit.

A step-out detector 190 used in the terminal unit will be described in detail with reference to FIG. 11. For simplicity, the coder 189 is omitted in the circuit in FIG. 11. A position detector 221 feeds a signal including phase data relating to the rotational direction of a motor when the motor rotates by a given angle to lines 254 and 255.

The position detector is generally classified into two types; one for producing digital signals and the other for producing analog signals. The latter type position detector is applicable for this step-out detector if the analog output signal is converted into the corresponding digital signal by using a known circuit.

Reference numerals 222 to 225 denote AND gates, 226 an OR gate and 227 a counter which receives a rotation pulse. When receiving at the reset terminal 228 a signal "1", it is cleared. Numeral 229 designates a set/reset flip-flop (R-SFF), numerals 330 and 331 are JK flip-flops (JKFF), numeral 232 an OR gate, and numeral 7 a magnetic brake. The magnetic brake 7, which is directly coupled with the rotation shaft of the motor 1, produces a brake torque when the output of the OR gate 232 becomes "1" and when the power source of the motor is shut off.

The operation of the step-out detecting circuit 190 thus constructed will be described with reference to FIG. 12. Assume now that a forward rotation command signal of "1" is applied to the terminal 300 in the circuit of FIG. 11 and a pulse as shown in FIG. 12(A) is applied to a terminal 302, and the motor 41 is rotating.

At this time, a counter 227 counts rotation pulses and, when a clear signal is applied to the terminal 228, produces a signal "1" to lines 256 and 257 every 4 pulses or 5 pulses, with an assumption of n=5. When the motor 41 rotation follows the rotation pulses, that is, without being stepped out, a detector 221 for detecting a rotation position of the motor produces position signals as shown in FIGS. 12(D) and (E). Therefore, no signal appears at the n-bit terminal 257 of the counter 227.

The position detector 221, which is a known shaft encoder in this example, produces such output signals that the output signal at the terminal 254 (255) is in advance of the output signal at the terminal 255 (254) by approximately 90°, when the motor rotates forwardly (reversely). The different phase angle is not limited to 90° but may be any phase angle if it can discriminate merely the direction of the motor rotation. Therefore, the output signal of the EOR gate 234 becomes as shown in FIG. 12(F) and the output signal of the 224 is as shown in FIG. 12(G).

Figure 12:
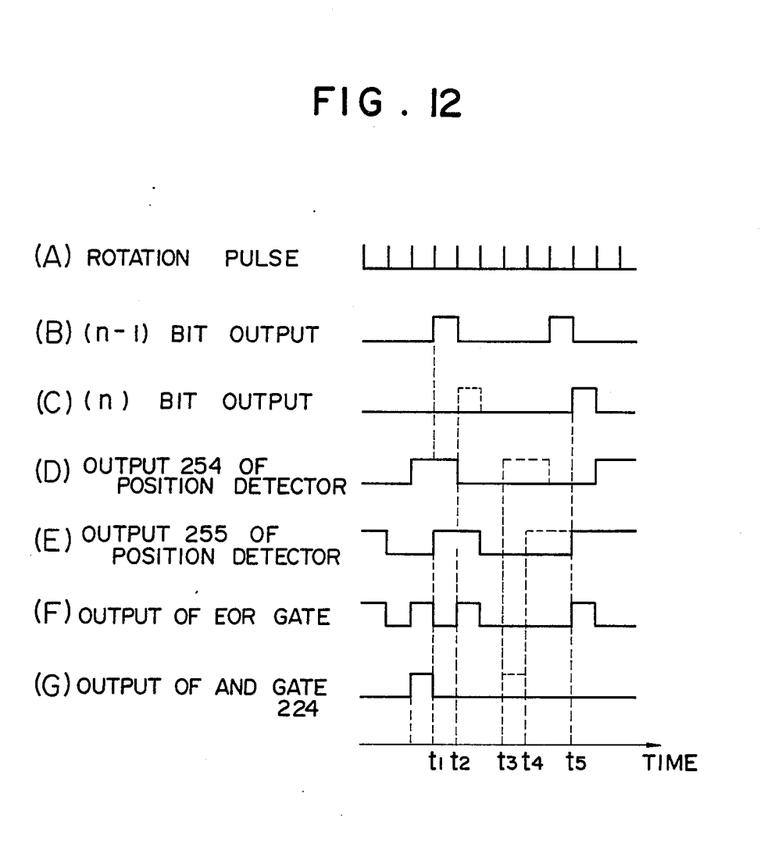
FIGS. 12 and 13 show sets of waveforms useful in explaining the operation of the step-out detecting circuit shown in FIG. 10.

Thus, a clear signal is surely applied to the counter 227 every five pulses applied thereto and, at time t2 indicated by a dotted line in FIG. 12(C), no pulse is produced and the counter starts its counting operation from zero count.

When the motor steps out and the rotation speed is slower than the speed determined by the frequency of an input pulse, the position detector produces no output signal at time t3 or t4 in FIG. 12 so that the counter 227 produces a signal "1" to the line 257 when receiving five pulses. Therefore, the output terminal Q of the flip-flop 229 becomes "1".

That is, the step-out detecting circuit detects the very step-out phenomenon that, when given pulses are applied to the motor, the motor rotation does not follow the given pulses.

Figure 13:
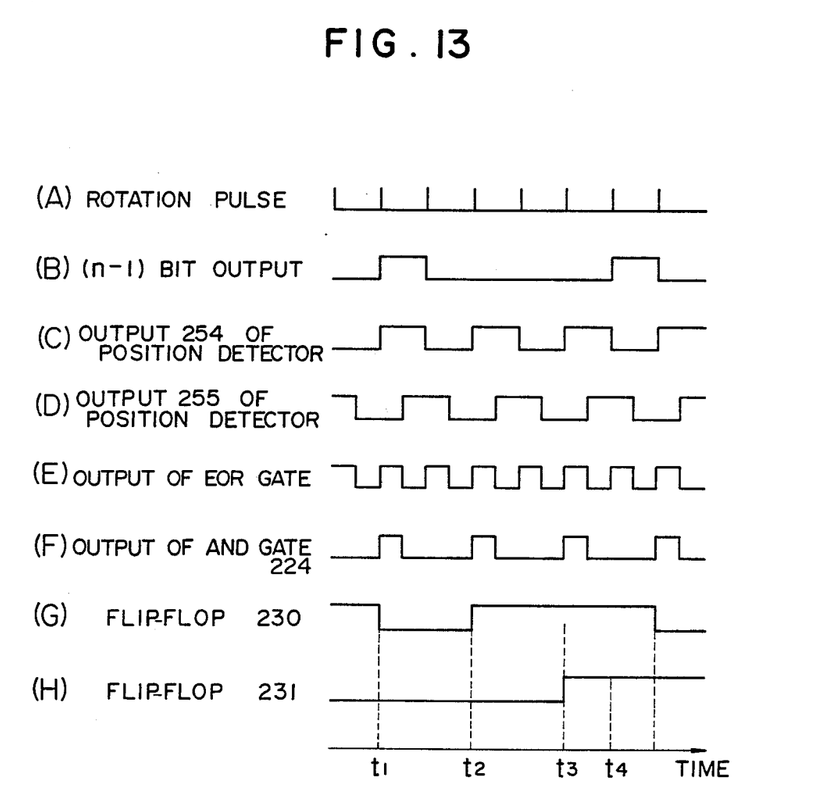

The explanation to be given referring to FIG. 13 is the elaboration of another step-out phenomenon that an external force causes the motor to rotate at a higher speed than that determined by the frequency of the input pulse.

When the motor rotates normally, i.e. without being stepped out, the n-1 bit output of the counter 227 necessarily becomes "1" before two position signals comes in the counter 227. Therefore, the flip-flops 230 and 231 are cleared by the "1" bit output signal and "1" signal does not appear at the output Q of the flip-flop 231 by no means.

When the motor steps out and rotates at a higher speed than the synchronizing speed, the n-1 bit output of the counter 227 is not "1" during a period of time from t1 to t4, as shown in FIG. 13(B) but the position detector 221 produces two output signals at times t2 and t3, as shown in FIGS. 13(C) and (D) and these position detector signals become the output signals of the AND gates 224, and further serves as clock pulses to the J-K flip-flops 230 and 231. At time t2 the output signal at the output terminal Q of the flip-flop 230 becomes logical "1" and at time t3 the output Q of the flip-flop 231 becomes logical "1". As a result, the step-out of the motor is detected.

As described above, the bit number n of the counter 227 must be determined on the basis of the resolution of the position detector. For example, when the counter 227 produces a single position pulse when receiving five rotation pulses, as in the embodiment, the bit number n is selected to be 5, that is, n=5.

When n is larger than 5, there is a case where the step-out detecting circuit fails to detect the stepout phenomenon even when the motor rotates at a slower speed than the synchronization speed. When n is selected to be smaller than 5, it produces a signal representing a step-out even when the motor rotates in a normal condition.

After the step-out is detected in this manner, the magnetic brake 7 is driven to keep the control rod at the present position for ensuring a safty.

When the motor rotates normally or when it produces a holding torque while being DC-excited, the brake 7 is energized by the same power source (not shown) to be in a release condition. Under this condition, if some causes stops the power source, the brake 7 automatically produces a brake torque to prevent the control rod from dropping due to its weight.

Figure 11:
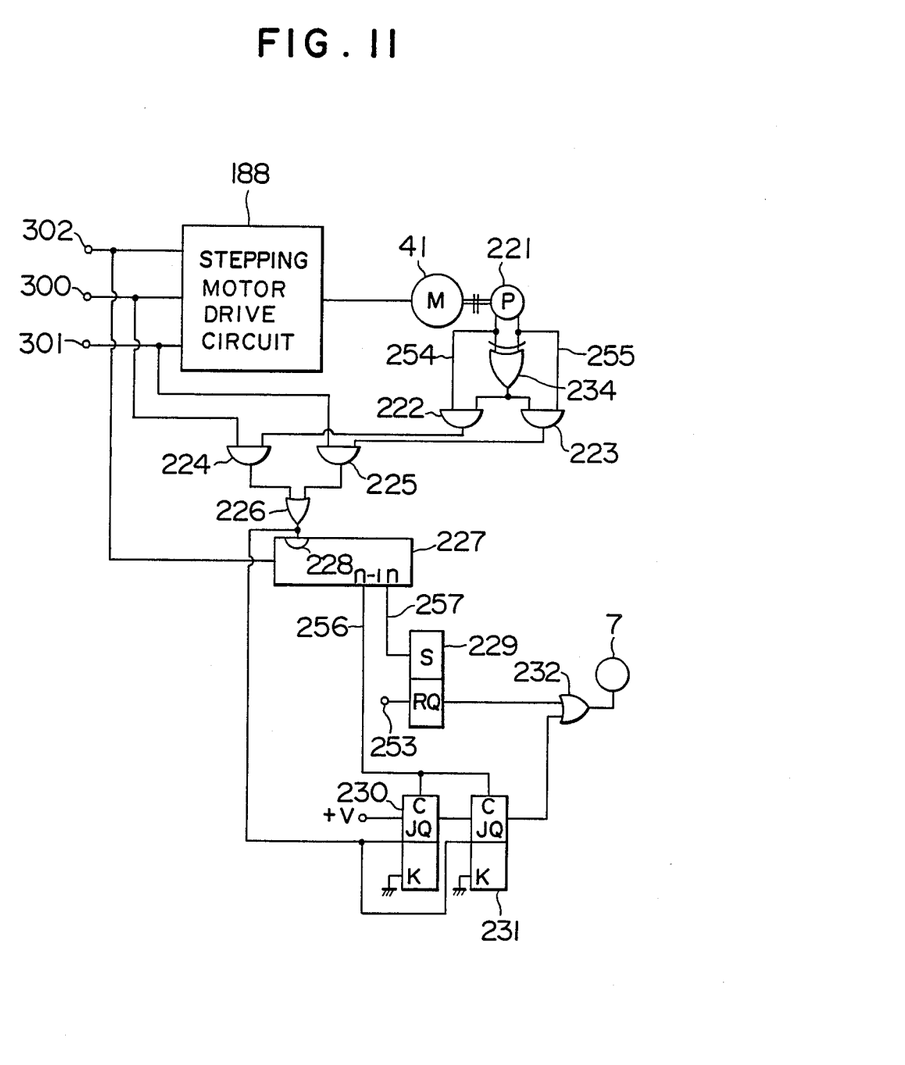
FIG. 11 shows a circuit diagram of an example of the step-out detecting circuit.

As described above, the step-out detecting circuit shown in FIG. 11 enables the brake 7 to automatically be driven thereby to hold the control rod at the present position, when the motor steps out or the power source stops to cause the motor to produce no torque.

In the example mentioned above, J-K flip-flops are used for detecting the step-out when the motor rotates at a higher speed than the synchronization speed. However, those may be replaced by a counter.

Figure 14:
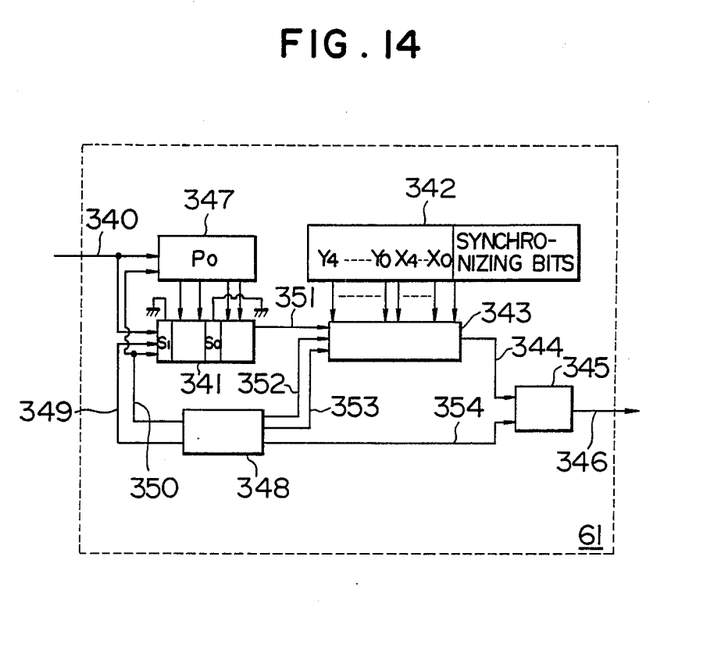
FIG. 14 shows a circuit diagram of an example of a multiplexer used in the circuit shown in FIG. 2.
Figure 15:
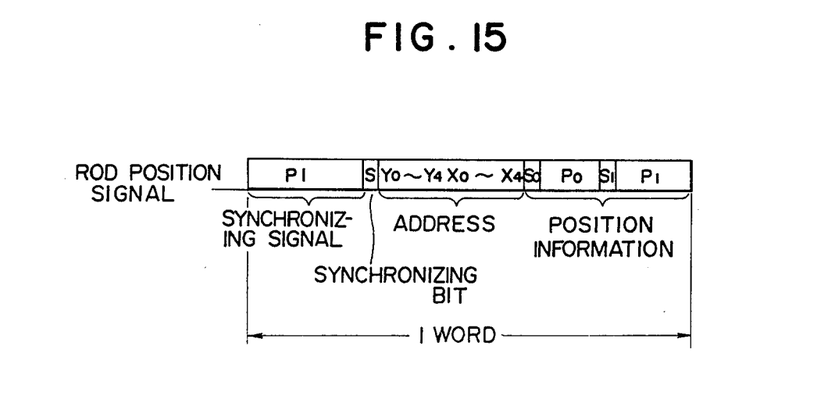
FIG. 15 shows a format of a rod position signal.
Figure 16:
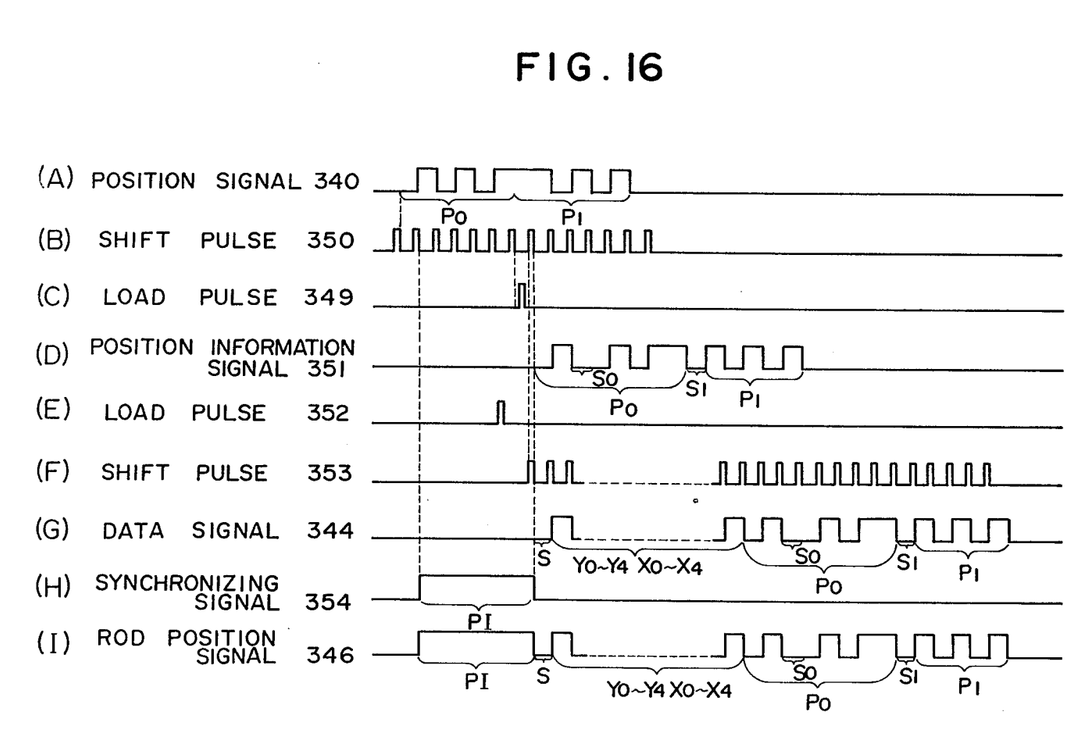
FIG. 16 shows a set of waveforms of the signals useful in explaining the operation of the multiplexer 61.

The multiplexer 61 shown in FIG. 2 will be described in detail with reference to FIGS. 14, 15 and 16. An example of the multiplexer according to the invention is shown in FIG. 14. In FIG. 14, a position signal 340 (FIG. 15(A)) outputted from the position detector is loaded into a storing register 347 and a position data register 341, in response to a shift pulse 350 as shown in FIG. 16(B). When the position data loaded into the storing register 347 reaches Po, a pulse generator 348 produces a load pulse as shown in FIG. 16(C) and the position information Po and space bits So and S1 are stored in the position data register 341. The position data P1 to be transmitted and the position information Po just stored in the position data register 341 are continuously loaded into a shift register 343, as shown in FIG. 16(D) and shifted by shift pulses 353 outputted from the pulse generating circuit 348. Synchronizing bits and a control rod address signal from a coordinate card 342 are loaded into the shift register 343, in response to load pulses properly timed as shown in FIG. 16(E). The signals loaded from the coordinate card 342 and the signal transferred from the position data register 341 are shifted out in a continuous manner as shown in FIG. 16G, into a summing circuit 345, in response to shift pulses 353 as shown in FIG. 16(F). In the summing circuit 345, a data signal outputted from the summing circuit 345 and a synchronizing signal 354 as shown in FIG. 16(H) outputted from the pulse generator 348 are summed to form a control rod position signal 346 as shown in FIG. 16(I).

A setting method for setting space bits So and S1 will be described. As shown in FIG. 15, a control rod position signal is series-arranged data with a fixed (for example, 32 bits) including a synchronizing signal field, an address signal field and a position information field. Therefore, the control rod position signal must be constructed to distinguish the synchronizing signal from the address signal field and the position information field.

In order to express approximately 200 control rods in X=Y coordinates, $2^5 \times 2^5 \times 256$ and thus Yo to Y4 to Xo to X4 and therefore 10 bits are totally needed. With respect to the address expression of the control rods, the maximum number of X and Y address bits permitting those bits to continuously be at the same level, for example, "1", is 5. Since the control rods are symmetrically arranged, if the X and Y addresses orders are inverted, respectively, that maximum order is the same, i.e. 5. Therefore, in order to distinguish between the synchronizing and address signals which are formed by fixed logics, 6 or more bits are necessary for the synchronizing signal.

As mentioned previously, the position information field in FIG. 15 needs at least 12 bits. For distinction between the synchronizing signal and the position information field, the position signal accordingly is divided into two sections and the space bits So and S1, which are fixed to "0", are provided by relating the synchronizing signal to the position information field so as to satisfy the following relations. Po<PI−1 and P1<PI where PI designates bit number of the synchronizing signal and Po and P1 the divided position information amounts, respectively.

A synchronizing signal for synchronizing control units operating asynchronously in a series transmission system, the address signal of the control rod and the position signal of control rod can clearly be distinguished if the just-mentioned relations of the synchronizing signal to the control rod position signals are satisfied.

Further, if such a condition as to satisfy the relations is introduced, the head addresses of the X and Y coordinate axes of the control rod array are not necessarily attached to the heads of the respective address signals.

Figure 17:
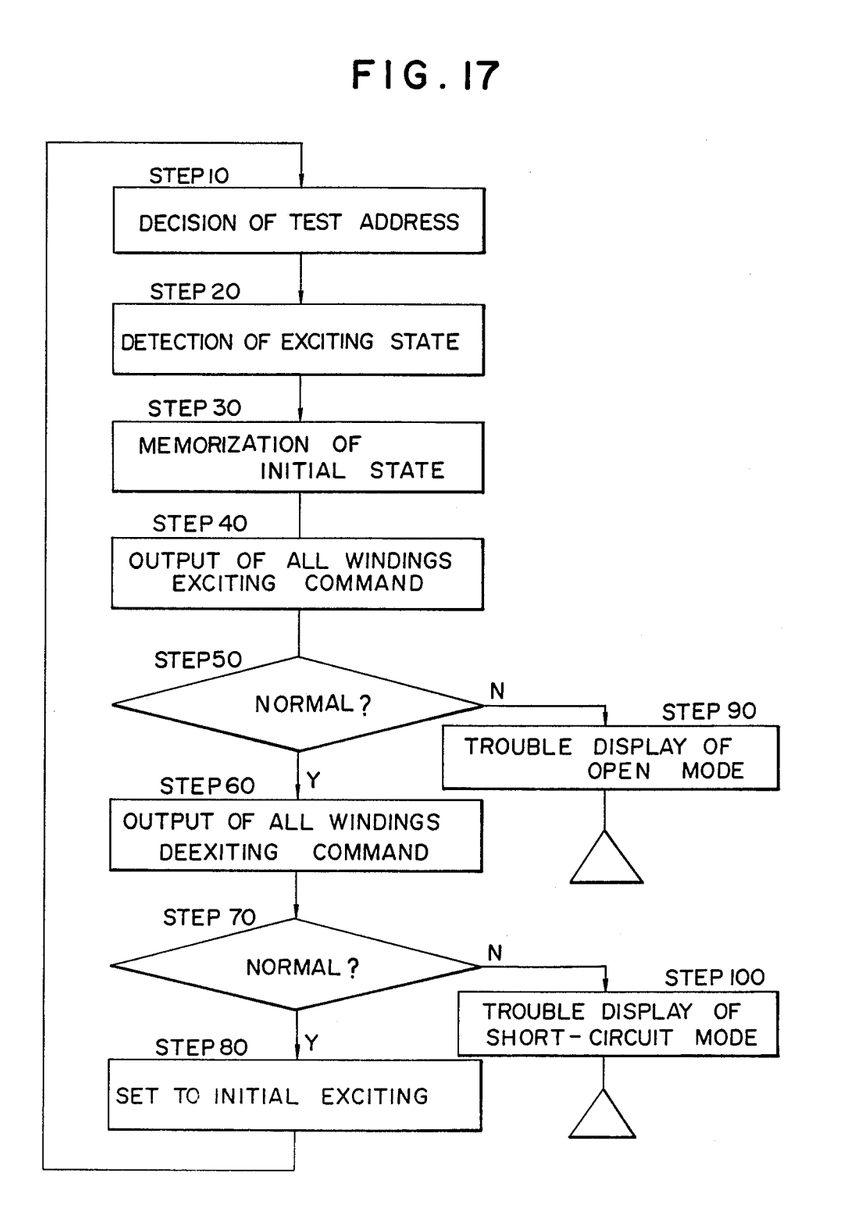
FIG. 17 shows a flowchart of a test procedure of the terminal unit.

A test method of the terminal units will finally be described with reference to FIG. 17 illustrating a flow-chart of a procedure for terminal unit testing. A step 10 determines the address of the terminal unit to be tested and causes the comparing circuit shown in FIG. 3 to produce a command to detect an exciting condition of the motor coupled with the terminal unit. When receiving an acknowledge signal returned from the terminal unit, the comparing circuit stores the exciting state at that time. Since the operation until now has no change of the exciting condition, the motor does not rotate by no means. A step 40 issues a command to magnetically excite all the exciting windings of the rotor stator and checks as to whether all the stator windings are excited or not. When all the stator windings are excited in a normal condition, a step 60 produces a command to release the winding excitation or to deenergize the windings and a step 70 similarly checks if all the windings are deenergized or not. If all the windings are deenergized in the normal condition, a step 80 resets the exciting state of the terminal unit to the initial state, and updates the address to repeat the test operation in a similar manner. If an abnormal state is detected, an open mode or a shortcircuit mode and the address of the abnormal or trouble terminal unit are displayed and the test operation s stopped.

In the all-winding excitation or the all-wind deenergization, the motor torque is zero (in the case of a permanent magnet type motor, the torque is decreased). However, the zero-torque time is at most 400 μs and therefore it never moves the control rod. Additionally, after the test is completed, the step 80 resets the exciting state to the initial state and the motor is never rotated.

As described above, the test execution is applicable for the open mode and the shortcircuit mode, without rotating the motor. This eliminates weariness problem. Additionally, when a trouble occurs, the trouble and its state, and the address of the trouble location are displayed. This makes the related repairs easy. As a consequence, the test method is well suitable for the rod drive control of a power nuclear reactor.

The test method shown in FIG. 17 does not reset the exciting state to the initial state, after all the windings have been excited. However, in case where the machine cycle is long or the mechanical time constant of an object to be tested is shorter, the exciting state may be reset to the initial state immediately after the test is completed, so as not to move the control rod.

Further, when a trouble is found, the trouble control rod is locked at its position by using a magnetic brake. It is evident that either the all-winding excitation or the deenergization may start first.

As described above, the rod drive control system according to the invention checks as to if the terminal unit operates properly or not by using the return comparing or verifying method and always performs an on-line test of the terminal units with the specified addresses. Accordingly, when a trouble occurs, the trouble can immediately be detected and therefore an erronous operation of the control rod due to its troble can effectively be prevented. Further, the circuit construction of the terminal unit is very simple. The use of the multiplexed digital signal greatly saves the signal lines coupling the control unit with the terminal units.

The stepping motors used as motors in the above example may be replaced by any other suitable motors such as DC motors or induction motors.

As described above, the system according to the invention has a function to check on-lines and a needs a small number of cables and a small number of parts of the terminal units. Therefore, it is well suitable for the rod drive control system for a power reactor.

I claim:

1. A rod drive control system for nuclear reactors comprising:

a plurality of stepping motors for inserting and withdrawing control rods disposed within the reactor, which are each provided for each of said control rods;

terminal units which are each provided for each stepping motor and are each provided with a stepping motor controller which, in response to an operation signal in a command signal, produces a stepping motor drive signal for driving the associated stepping motor and, in response to a test signal, checks the operation of an associated stepping motor and sends back an acknowledge signal representing the state of the associated stepping motor;

a central processing unit including first means for alternately transmitting the operation signal and a test signal to each of said step motor controllers, second means which compares the test signal applied to said terminal unit with the acknowledge signal returning from the associated terminal unit in response to the associated test signal for detecting a fault of the associated terminal unit, third means for superposing the operation signal on the command signal applied to said stepping motor at a given time interval and fourth means for changing the given time interval of said third means in accordance with an operation mode of the associated control rod; and transmission lines provided between said central processing unit and said terminal units.

2. A rod drive control system according to claim 1, in which each of said terminal units includes first comparing means for comparing the address included in the command signal coming to a terminal unit with the address of the terminal unit per se, second means for forming the acknowledge signal and third means for driving the related stepping motor when both addresses are coincident.

3. A rod drive control system according to claim 2, in which each of said terminal units further include fourth means for detecting a step-out of said stepping motor, which produces a signal for blocking the operating of said stepping motor on the basis of a rotation pulse signal included in the command signal and a signal representing an angular position of said rotating motor.

4. A rod drive control system for nuclear reactors, comprising:

a plurality of stepping motors for inserting and withdrawing control rods disposed within the reactor, each of said motors being provided for an associated one of said control rods, terminal units each provided for an associated one of said stepping motors and provided with a stepping motor controller for driving the associated stepping motor and for checking the operation of the associated stepping motor.

a central processing unit for transmitting command signals to each of said stepping motor controllers, said command signal including an operation signal for driving the associated stepping motor and a test signal for checking the operation of the associated stepping motor, the operation signal and the test signal being alternately transmitted to each of said stepping motor controllers, and the rotation speed of each of said stepping motors being controlled by controlling in said central processing unit an interval with which the operation signal, having a signal component for substantially rotating the associated stepping motor, is generated, and transmission lines provided between said central processing unit and said terminal units.

5. A rod drive control system according to claim 4, wherein the test signal includes a signal component for at least one of energizing and deenergizing all windings of the stator of the associated stepping motor.

6. A rod drive control system according to claim 1, wherein the test signal is transmitted and the acknowledge signal is sent back without operating the stepping motor to drive the associated control rod.

7. A rod drive control system according to claim 1, wherein said stepping motor is rotated in response to the operation signal and the rotation speed of said stepping motor is controlled in accordance with the given time interval of the operation signal as provided by said third and fourth means.

8. A rod drive control system according to claim 1, wherein the nuclear reactor is a boiling water reactor.

9. A rod drive control system according to claim 4, wherein the operation of the stepping motor is checked without operating the stepping motor to drive the associated control rod.

10. A rod drive control system according to claim 4, wherein the stepping motor controller sends back to the central processing unit an acknowledge signal representing the state of the associated stepping motor in response to the test signal, and the central processing unit includes means for comparing the test signal and the acknowledge signal for detecting a fault of the associated terminal unit.

11. A rod drive control system according to claim 4, wherein the nuclear reactor is a boiling water reactor.

* * * * *